US011206663B2

(12) United States Patent
Xu (10) Patent No.: US 11,206,663 B2
(45) Date of Patent: Dec. 21, 2021

(54) METHOD FOR CONFIGURING FRAME STRUCTURE, NETWORK SIDE DEVICE, AND TERMINAL

(71) Applicants: CHINA MOBILE COMMUNICATION LTD., RESEARCH INSTITUTE, Beijing (CN); CHINA MOBILE COMMUNICATIONS CORPORATION, Beijing (CN)

(72) Inventor: Xiaodong Xu, Beijing (CN)

(73) Assignees: China Mobile Communication Ltd., Research Institute, Beijing (CN); China Mobile Communications Corporation, Beijing (CN)

( * ) Notice: Subject to any disclaimer, the term of this patent is extended or adjusted under 35 U.S.C. 154(b) by 19 days.

(21) Appl. No.: 16/324,289

(22) PCT Filed: Aug. 11, 2017

(86) PCT No.: PCT/CN2017/097076
§ 371 (c)(1),
(2) Date: Feb. 8, 2019

(87) PCT Pub. No.: WO2018/028672
PCT Pub. Date: Feb. 15, 2018

(65) Prior Publication Data
US 2019/0174494 A1 Jun. 6, 2019

(30) Foreign Application Priority Data
Aug. 12, 2016 (CN) .......................... 201610664289.6

(51) Int. Cl.
*H04W 72/04* (2009.01)
*H04W 72/12* (2009.01)
(Continued)

(52) U.S. Cl.
CPC ....... *H04W 72/0446* (2013.01); *H04L 5/0044* (2013.01); *H04L 27/2607* (2013.01);
(Continued)

(58) Field of Classification Search
CPC . H04W 72/0446; H04W 72/12; H04W 72/04; H04W 56/001; H04W 56/0045;
(Continued)

(56) References Cited

U.S. PATENT DOCUMENTS

2010/0002664 A1  1/2010 Pan et al.
2010/0246456 A1* 9/2010 Suo ...................... H04B 7/2656
                                                                370/280
(Continued)

FOREIGN PATENT DOCUMENTS

CN     101868027 A       10/2010
CN     102695276 A  *    9/2012
(Continued)

OTHER PUBLICATIONS

Extended European Search Report for European Patent Application No. 17838802.1, dated Mar. 11, 2020, 10 pages.
(Continued)

*Primary Examiner* — Shailendra Kumar
(74) *Attorney, Agent, or Firm* — Morgan, Lewis & Bockius LLP (57) ABSTRACT

A method for configuring a frame structure, a network side device and a terminal are provided. A relevant frame structure is modified so that uplink and downlink transmission resources are flexibly adjusted, so as to be adapted to requirements of uplink and downlink services and not be limited to a certain type or certain types of fixed uplink and downlink configurations and GP configurations. The method includes determining a first periodicity and first indication information, wherein the first periodicity is a frame period-
(Continued)

icity configured for a carrier or a periodicity in which a uplink transmission appears; the first indication information is used to indicate whether a time-domain transmission resource available for the uplink transmission exists in the first periodicity or not; and, if the time-domain transmission resource exists, indicate a position of the time-domain transmission resource.

18 Claims, 4 Drawing Sheets

(51) Int. Cl.
　　*H04L 5/00*　　　(2006.01)
　　*H04L 27/26*　　(2006.01)
　　*H04W 56/00*　　(2009.01)
(52) U.S. Cl.
　　CPC ......... *H04W 56/001* (2013.01); *H04W 72/04* (2013.01); *H04W 72/12* (2013.01)
(58) Field of Classification Search
　　CPC ........... H04W 56/0015; H04W 72/042; H04W 72/14; H04L 5/0044; H04L 27/2607
　　See application file for complete search history.

(56) References Cited

U.S. PATENT DOCUMENTS

| | | |
|---|---|---|
| 2012/0094687 A1 | 4/2012 | Choi et al. |
| 2014/0029569 A1 | 1/2014 | Ni |
| 2015/0043392 A1 | 2/2015 | Susitaival et al. |
| 2015/0071133 A1 | 3/2015 | Li et al. |
| 2016/0044672 A1* | 2/2016 | Quan .................. H04L 5/00 370/280 |
| 2019/0014560 A1* | 1/2019 | Takeda ............... H04W 72/0446 |
| 2019/0150170 A1* | 5/2019 | Park .................... H04W 74/08 370/329 |
| 2019/0173655 A1* | 6/2019 | Shimezawa ........... H04L 5/0098 |
| 2020/0305177 A1* | 9/2020 | Yasukawa ............. H04L 1/1861 |

FOREIGN PATENT DOCUMENTS

| | | |
|---|---|---|
| CN | 102695276 A | 9/2012 |
| CN | 102761968 A | 10/2012 |
| CN | 102905373 A | 1/2013 |
| CN | 104349459 A | 2/2015 |
| JP | 2014-515208 A | 6/2014 |
| JP | 2015-204514 A | 11/2015 |
| KR | 10-2014-0136923 A | 12/2014 |
| WO | WO 2015/046165 | 4/2015 |

OTHER PUBLICATIONS

Japanese Office Action for Japanese Patent Application No. 2019-506621, dated Feb. 17, 2020, 10 pages.
Chinese Application No. 201610664289.6, Office Action dated Jun. 25, 2019.
PCT International Search Report for PCT Patent Application No. PCT/CN2017/097076 dated Nov. 10, 2017. 4 Pages.
Indian Office Action dated Dec. 29, 2020, for Indian Patent Application No. 201927008421, 6 pages.

* cited by examiner

Fig. 4 receiving, by the terminal, configuration information of the first period and the first indication information transmitted by the network side device through the broadcast information, wherein the first period is the frame period configured for a carrier or the period in which the uplink transmission appears, the first indication information is used to indicate whether a time-domain transmission resource available for the uplink transmission exists in the first period or not; if the time-domain transmission resource exists, the first indication information is used to indicate the position of the time-domain transmission resource ⟵ 51 determining whether a time-domain transmission resource available for the uplink transmission exist or not or a position of the time-domain transmission resource available for the uplink transmission by the terminal according to the configuration information of the first period and the first indication information ⟵ 52

METHOD FOR CONFIGURING FRAME STRUCTURE, NETWORK SIDE DEVICE, AND TERMINAL

CROSS-REFERENCE TO RELATED APPLICATION

The present application claims a priority of a Chinese application No. 201610664289.6 filed in China on Aug. 12, 2016, a disclosure of which is incorporated herein in its entirety by reference.

TECHNICAL FIELD

The present disclosure relates to a technical field of mobile communication, and specifically, relates to a method for configuring a frame structure, a network side device, and a terminal.

BACKGROUND

Figure 1:
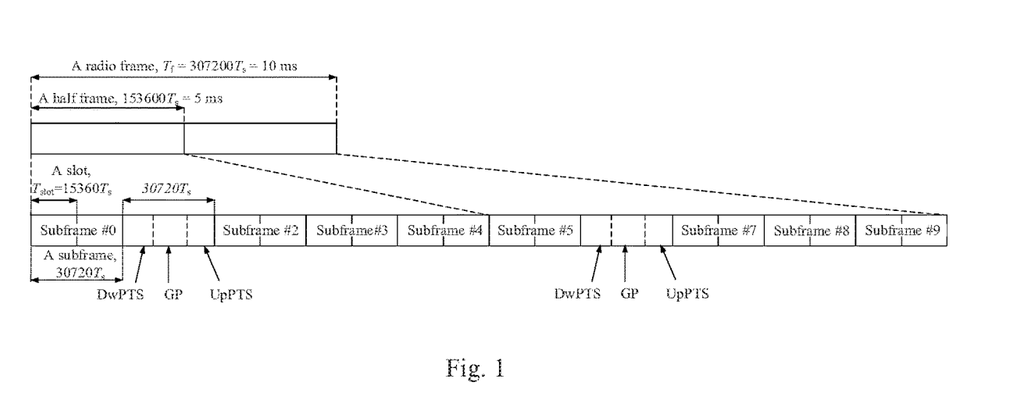
FIG. 1 is a schematic diagram of a frame structure used in a relevant LTE TDD system.

A frame structure used in a relevant Long Term Evolution (LTE) Time-Division Duplex (TDD) system is schematically shown in FIG. 1. In the TDD system, different subframes or different slots in a same frequency band are used for uplink transmission and downlink transmission. In FIG. 1, each radio frame having a duration of 10 ms includes two half-frames, each of which has a duration of 5 ms; each of the half-frames includes five subframes, each of the subframes has a duration of 1 ms. The subframes in FIG. 1 include three types: downlink subframes, uplink frames, and special frames. Each of the special frames includes a Downlink Pilot Time Slot (DwPTS), a Guard Period (GP), and a Uplink Pilot Time Slot (UpPTS). Each of the half frames includes at least one downlink subframe and at least one uplink subframe, and at most one special frame.

The relevant LTE TDD system pre-defines uplink and downlink time-slot configurations (such as 3GPP TS36.211 Table 4.2-2 shown in Table 1 below) and a GP configuration made by taking a cell radius as a main design consideration (such as 3GPP TS36.211 Table 4.2-1 shown in Table 2 below).

TABLE 1

| Uplink-downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

TABLE 2

| | | Normal cyclic prefix in downlink | | | Extended cyclic prefix in downlink | | |
|---|---|---|---|---|---|---|---|
| | | | UpPTS | | | UpPTS | |
| Special subframe configuration | DwPTS | Normal cyclic prefix in uplink | Extended cyclic prefix in uplink | DwPTS | Normal cyclic prefix in uplink | Extended cyclic prefix in uplink |
| 0 | $6592 \cdot T_s$ | $2192 \cdot T_s$ | $2560 \cdot T_s$ | $7680 \cdot T_s$ | $2192 \cdot T_s$ | $2560 \cdot T_s$ |
| 1 | $19760 \cdot T_s$ | | | $20480 \cdot T_s$ | | |
| 2 | $21952 \cdot T_s$ | | | $23040 \cdot T_s$ | | |
| 3 | $24144 \cdot T_s$ | | | $25600 \cdot T_s$ | | |
| 4 | $26336 \cdot T_s$ | | | $7680 \cdot T_s$ | $4384 \cdot T_s$ | $5120 \cdot T_s$ |
| 5 | $6592 \cdot T_s$ | $4384 \cdot T_s$ | $5120 \cdot T_s$ | $20480 \cdot T_s$ | | |
| 6 | $19760 \cdot T_s$ | | | $23040 \cdot T_s$ | | |
| 7 | $21952 \cdot T_s$ | | | — | — | — |
| 8 | $24144 \cdot T_s$ | | | — | — | — |

As may be seen from Tables 1 and 2, in an example of a pattern repeated for every 5 ms, a normal downlink subframe is generally arranged firstly, then an incomplete downlink frame is arranged, and then a GP is arranged. Thereafter, a uplink transmission subframe or a symbol is arranged, and after the uplink transmission subframe or the symbol, another downlink subframe is probably arranged. In short, two switches, i.e., from downlink subframe to uplink subframe and from uplink subframe to downlink subframe, happen in the 5 ms, and a length of the GP is relatively fixed and is difficult to be changed. In a current Time-Division Long-Term Evolution (TD-LTE) network, a problem that a length of the GP is insufficient has occurred, and a severe interference from a distal base station has been generated. Based on this, a new frame structure is needed to enhance flexibility of system configuration.

SUMMARY

Some embodiments of the present disclosure provide a method for configuring a frame structure, a network side device and a terminal, so as to provide flexibility for configuration of a system frame structure.

To address the above technical problem, some embodiments of the present disclosure provide a method for configuring a frame structure. The method includes transmitting configuration information of a first periodicity and first indication information to a terminal through broadcast information by a network side device, wherein the first periodicity is a frame periodicity configured for a carrier or a periodicity in which a uplink transmission appears; the first indication information is used to indicate whether a time-domain transmission resource available for the uplink transmission exists in the first periodicity or not; and is further used to, if the time-domain transmission resource available for the uplink transmission exists, indicate a position of the time-domain transmission resource available for the uplink transmission.

Some embodiments of the present disclosure provide another method for configuring a frame structure. The method includes receiving, by a terminal, configuration information of a first periodicity and first indication information transmitted by a network side device through broadcast information, wherein the first periodicity is a frame periodicity configured for a carrier or a periodicity in which a uplink transmission appears, the first indication information is used to indicate whether a time-domain transmission resource available for the uplink transmission exists in the first periodicity or not; and the first indication information is further used to, if the time-domain transmission resource exists, indicate a position of the time-domain transmission resource available for the uplink transmission; and determining whether the time-domain transmission resource available for the uplink transmission exists or not or the position of the time-domain transmission resource available for the uplink transmission by the terminal according to the configuration information of the first periodicity and the first indication information.

Some embodiments of the present disclosure provide a network side device. The network side device includes a first transmission unit, to transmit configuration information of a first periodicity and first indication information to a terminal through broadcast information, wherein the first periodicity is a frame periodicity configured for a carrier or a periodicity in which a uplink transmission appears, the first indication information is used to indicate whether a time-domain transmission resource available for the uplink transmission exists in the first periodicity or not; and is further used to, if the time-domain transmission resource available for the uplink transmission exists, indicate a position of the time-domain transmission resource available for the uplink transmission.

Some embodiments of the present disclosure provide a terminal. The terminal includes a first reception unit, to receive configuration information of a first periodicity and first indication information transmitted by a network side device through broadcast information, wherein the first periodicity is a frame periodicity configured for a carrier or a periodicity in which a uplink transmission appears, the first indication information is used to indicate whether a time-domain transmission resource available for the uplink transmission exists in the first periodicity or not; and the first indication information is further used to, if the time-domain transmission resource exists, indicate a position of the time-domain transmission resource available for the uplink transmission; and a first determination unit, to determine whether the time-domain transmission resource available for the uplink transmission exists or not or the position of the time-domain transmission resource available for the uplink transmission, according to the configuration information of the first periodicity and the first indication information.

Some embodiments of the present disclosure provide a network side device. The network side device includes a processor, a storage, and a transmitter, wherein, the processor is to generate configuration information of a first periodicity and first indication information by invoking and executing programs and data stored in the storage; the transmitter is to transmit the configuration information of the first periodicity and the first indication information to a terminal through broadcast information; wherein, the first periodicity is a frame periodicity configured for a carrier or a periodicity in which a uplink transmission appears, the first indication information is used to indicate whether a time-domain transmission resource available for the uplink transmission exists in the first periodicity or not; and is further used to, if the time-domain transmission resource available for the uplink transmission exists, indicate a position of the time-domain transmission resource available for the uplink transmission.

Some embodiments of the present disclosure provide a terminal. The terminal includes a processor, a storage, and a receiver, wherein, the receiver is to receive configuration information of a first periodicity and first indication information transmitted by a network side device through broadcast information, wherein the first periodicity is a frame periodicity configured for a carrier or a periodicity in which a uplink transmission appears, the first indication information is used to indicate whether a time-domain transmission resource available for the uplink transmission exists in the first periodicity or not; and the first indication information is further used to, if the time-domain transmission resource exists, indicate a position of the time-domain transmission resource available for the uplink transmission; the processor is to determine, by invoking and executing programs and data stored in the storage, whether the time-domain transmission resource available for the uplink transmission exists or not or determine the position of the time-domain transmission resource available for the uplink transmission, according to the configuration information of the first periodicity and the first indication information.

Some embodiments of the present disclosure further provide a computer readable storage medium. The computer readable storage medium includes instructions stored on the computer readable storage medium and to implement following steps: transmitting configuration information of a first periodicity and first indication information to a terminal through broadcast information, wherein the first periodicity is a frame periodicity configured for a carrier or a periodicity in which uplink transmission appears, the first indication information is used to indicate whether a time-domain transmission resource available for the uplink transmission exists in the first periodicity or not; and is further used to, if the time-domain transmission resource available for the uplink transmission exists, indicate a position of the time-domain transmission resource available for the uplink transmission.

Some embodiments of the present disclosure further provide a computer readable storage medium. The computer readable storage medium includes instructions stored on the computer readable storage medium and to implement following steps: receiving configuration information of a first periodicity and first indication information transmitted by a network side device through broadcast information, wherein the first periodicity is a frame periodicity configured for a carrier or a periodicity in which a uplink transmission appears, the first indication information is used to indicate whether a time-domain transmission resource available for the uplink transmission exists in the first periodicity or not; and the first indication information is further used to, if the time-domain transmission resource exists, indicate a position of the time-domain transmission resource available for the uplink transmission; and determining whether the time-domain transmission resource available for the uplink transmission exists or not or determining the position of the time-domain transmission resource available for the uplink transmission, according to the configuration information of the first periodicity and the first indication information.

The method for configuring a frame structure, the network side device and the terminal provided in some embodiments of the present disclosure at least have following beneficial effects: resources for the uplink transmission and the downlink transmission may be flexibly adjusted through the present disclosure, so as to be adapted to requirements of uplink and downlink services and thereby not be limited to a certain type of fixed uplink and downlink configurations and GP configuration, or certain types of fixed uplink and downlink configurations and GP configurations; additionally, some embodiments of the present disclosure may also flexibly configure the length of the GP, so as to be adapted to a requirement of eliminating network interference.

DETAILED DESCRIPTION

In order to make technical problems to be solved, technical solutions, and advantages of the present disclosure clearer, specific embodiments will be described hereinafter in detail in combination with the drawings. Specific details of configurations and components provided hereinafter are only used to enhance thorough understanding of the embodiments of the present disclosure. Thus, it should be understood by one skilled in the art that various modifications and changes may be made to the embodiments described in the present disclosure without departing from the scope and the spirit of the present disclosure. Additionally, for purpose of clarity and brevity, descriptions of known functions and structures are omitted.

It should be understood that "an embodiment" or "one embodiment" mentioned throughout the specification of the present disclosure means that specific features, structures or characteristics related to the embodiment are included in at least one embodiment of the present disclosure. Therefore, "in an embodiment" or "in one embodiment" appearing throughout the specification of the present application does not necessarily mean an identical embodiment. Additionally, the specific features, structures or characteristics may be combined in one or more embodiments in any suitable combination.

In the embodiments of the present disclosure, it should be understood that sequential numbers in methods of the present disclosure do not represent sequential orders for performing the methods. Order for performing the methods should be determined according to inherent functional or logical sequences of the methods, and should not limit ways in which the methods are executed in the embodiments of the present disclosure.

Additionally, terms such as "system" and "network" in the present disclosure may be used interchangeably.

It should be understood that a term "and/or" in the present disclosure only represents an interrelated relation of described objects and may represent three relations of the objects. For example, 'A and/or B' may represent three cases that only the A exists, the A and the B concurrently exist, or only the B exists. Additionally, a symbol "/" in the present disclosure generally represents objects before and after the symbol have a relation "or" between them.

In the embodiments of the present disclosure, it should be understood that "B related to A" represents that the B is related to the A, and the B may be determined according to the A. It should be further understood that, "the B may be determined according to the A" does not mean that the B is determined only according to the A, and the B may also be determined according to the A and/or other factors.

In some embodiments of the present disclosure, a type of a base station is not limited, and may be a Macro Base Station, a Pico Base Station, a Node B (a name of a 3G base station), an enhanced Node B (eNB), a Home eNode B (a Home eNB or a HeNB) or a Femto eNB, a relay station, an access point, a Remote Radio Unit (RRU), a Remote Radio Head, and the like. A terminal may be a mobile phone (or a handset), or other devices capable of transmitting or receiving wireless signals including a User Equipment (UE), a personnel digital assistance (PDA), a wireless Modulator and Demodulator, a wireless communication device, a handhold device, a laptop, a wireless phone, a wireless local loop (WLL) station, a Customer Premise of Equipment (CPE) or a mobile intelligent hotspot capable of transforming a cellular signal to a WiFi signal, an intelligent household electrical appliance, or other devices capable of automatically communicating with a mobile communication network without an operation of a user.

Some embodiments of the present disclosure provide a new frame structure, and accordingly, provide a method for configuring the frame structure at a network side and a terminal side. In the frame structure provided in some embodiments of the present disclosure, each frame periodicity includes at most one switch point for transmission directions, and a switch direction is from downlink transmission to uplink transmission at this switch point. Each frame periodicity includes a plurality of time-domain transmission granularities. Each of the plurality of time-domain transmission granularities includes one or more symbols. Each of the one or more symbols belongs to a time-domain transmission resource. A length of each of the time-domain transmission granularities may be the same. A quantity of symbols included in each of the time-domain transmission granularities may be the same. Since each frame periodicity includes at most one switch point for transmission directions, at least a last symbol in a last time-domain transmission granularity in the frame periodicity is always used for the uplink transmission when the time-domain transmission resource for the uplink transmission exist in the frame period.

As one implementation, an entirety of a first periodicity may be used for the uplink transmission or the downlink transmission. For example, in case that the entirety of the first periodicity is used for the downlink transmission, first indication information may be further used to indicate that all time-domain resources in the first periodicity may be used for the uplink transmission.

Generally, the time-domain transmission resource available for the uplink transmission in the first periodicity may be configured semi-statically through the first indication information in broadcast information. In case that the time-domain transmission resource available for the uplink transmission needs to be changed, a change of the resource used for the uplink transmission may be indicated by changing contents of the first indication information. Therefore, before the first indication information is changed, the time-domain transmission resource available for the uplink transmission in the first periodicity is not changed, and is only used for the uplink transmission.

In addition, a length of the frame periodicity in some embodiments of the present disclosure may be adjusted according to requirements, i.e., the length of the frame periodicity is not unchangeable, for example, may be changed through changing the first indication information. However, if there are N continuous frame periodicities having a same length, positions of the switch points or time-domain transmission resources available for the uplink transmission in the frame periods are same in the frame periods.

Figure 2:
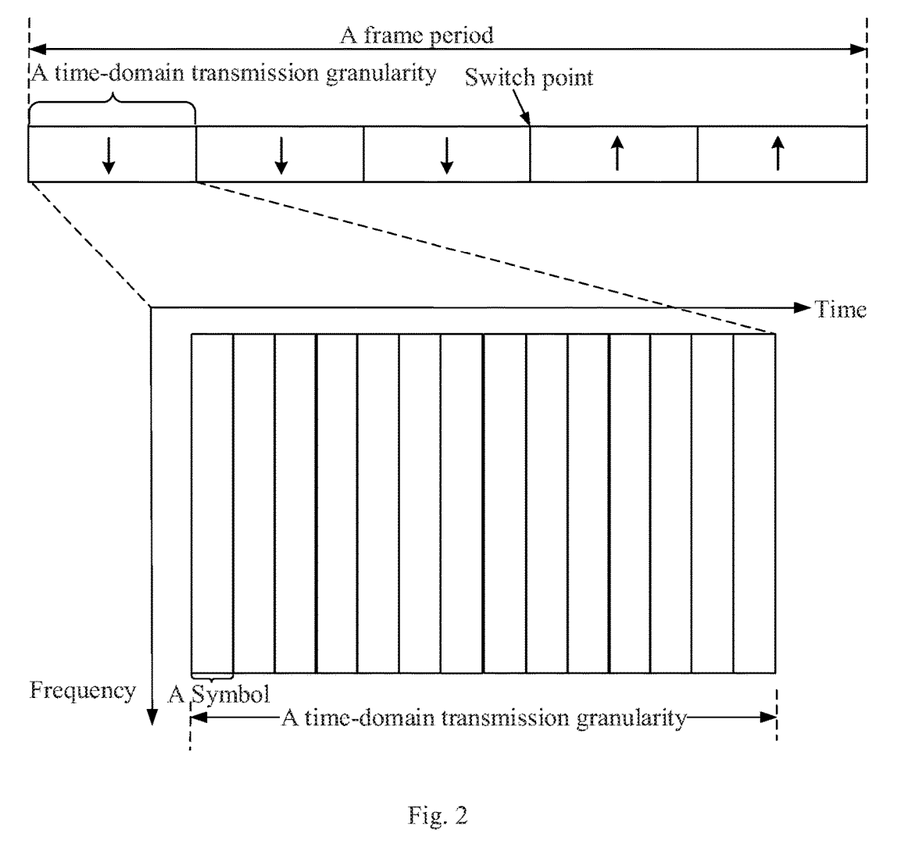
FIG. 2 is a schematic diagram of a frame structure used in some embodiments of the present disclosure.

Referring to FIG. 2, FIG. 2 shows an example of a frame structure according to some embodiments of the present disclosure. In the frame structure shown in FIG. 2, one frame periodicity includes five time-domain transmission granularities. Each of the time-domain transmission granularities includes fourteen symbols. The symbols in the present disclosure may be Orthogonal Frequency Division Multiplexing (OFDM) symbols or Single-carrier Frequency-Division Multiple Access (SC-FDMA) symbols. In FIG. 2, a direction of an arrow in each of the time-domain transmission granularities schematically shows a transmission direction of the time-domain transmission resource corresponding to the time-domain transmission granularity. It may be seen that a transmission direction of first three time-domain transmission granularities is a downlink direction, and a transmission direction of last two time-domain transmission granularities is a uplink direction, i.e., each frame periodicity at most includes one switch point for the transmission directions.

Figure 3:
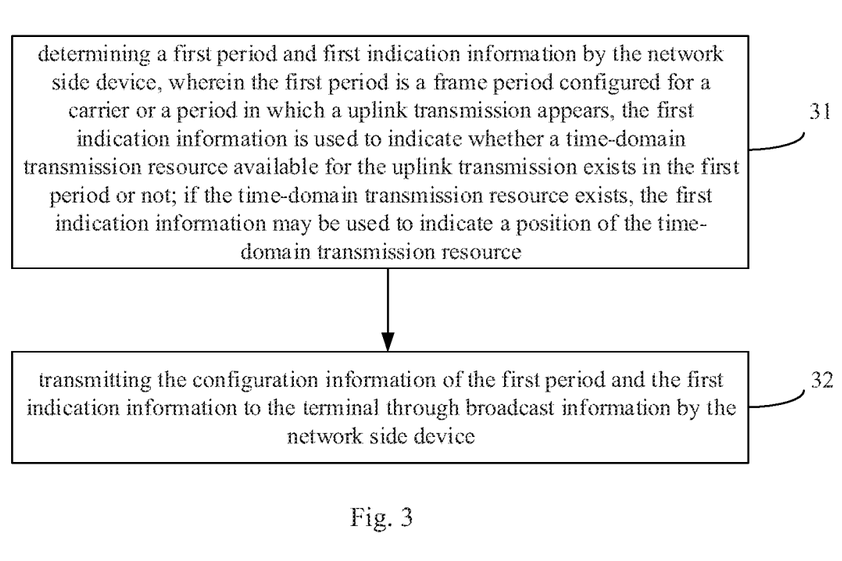
FIG. 3 is a flowchart of a method for configuring a frame structure provided in the embodiments of the present disclosure.

Referring to FIG. 3, some embodiments of the present disclosure provide a method for configuring a frame structure. The method is applied to a network side device, and may be specifically applied to a base station. The method includes steps 31 and 32.

Step 31: determining a first periodicity and first indication information by the network side device, wherein the first periodicity is a frame periodicity configured for a carrier or a periodicity in which a uplink transmission appears, the first indication information is used to indicate whether a time-domain transmission resource available for the uplink transmission exists in the first periodicity or not; if the time-domain transmission resource exists, the first indication information may be used to indicate a position of the time-domain transmission resource available for the uplink transmission.

In the present disclosure, the first periodicity may be the frame periodicity shown in FIG. 2. In such a case, configuration information of the first periodicity may be a length of the frame period. The first periodicity may also be the periodicity in which the uplink transmission appears. The periodicity in which the uplink transmission appears may be a periodicity in which continuous uplink transmissions appear once. In such a case, the configuration information of the first periodicity may not be direct information of the periodicity, but may be other information defined based on a predetermined periodicity.

Figure 4:
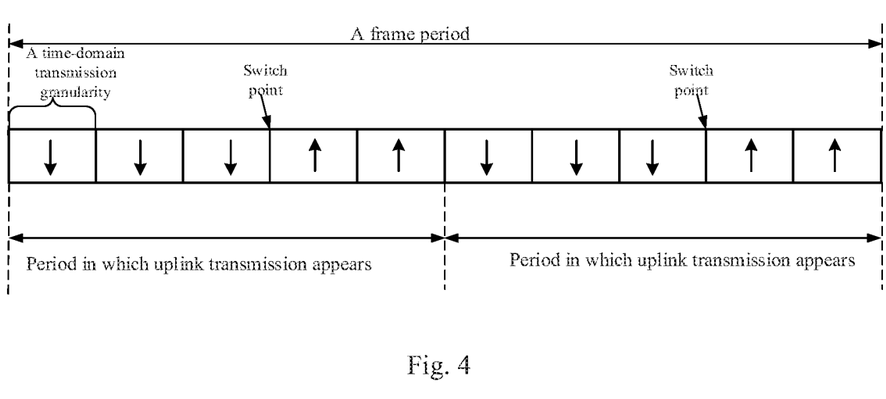
FIG. 4 is another schematic diagram of a frame structure used in some embodiments of the present disclosure.

Referring to FIG. 4, some embodiments of the present disclosure may use another frame structure. Assuming that the frame periodicity includes ten time-domain transmission granularities, and if a periodicity in which the uplink transmission appears is periodically occur by default in each frame periodicity, and the positions of the switch points in the periodicities in which the uplink transmission appears are the same, then each frame periodicity includes two periodicities in which the uplink transmission appears. The configuration information of the first periodicity may be lengths of the periodicities in which the uplink transmission appears, i.e., five time-domain transmission granularities. It may be seen that, the frame structure shown in FIG. 4 is actually formed by combining two frame structures shown in FIG. 2.

Additionally, if the length of the frame periodicity is assumed between the network side device and the terminal in advance, and the periodicity in which the uplink transmission appears occurs periodically by default in each frame period, then the positions of the switch points in the periodicities in which the uplink transmission appears are the same, then the configuration information of the first periodicity may also be a quantity of the switch points in each frame period. For example, in FIG. 4, the quantity is two, which indicates that there are two switch points in the frame periodicity including ten time-domain transmission granularities. According to this, the terminal may determine that the periodicity in which the uplink transmission appears includes five time-domain transmission granularities.

The first indication information may be used to indicate whether a time-domain transmission resource available for the uplink transmission exists in the first periodicity or not; if the time-domain transmission resource exists, the first indication information may be used to indicate a position of the time-domain transmission resource available for the uplink transmission. Specifically, multiple implementations may be used for indicating the position of the time-domain transmission resource available for the uplink transmission. One of the implementations is to indicate a start position of the time-domain transmission resource available for the uplink transmission in the frame period. The start position may be an absolute position or a relative position. The absolute position may be represented by a number of a time-domain transmission granularity, a symbol number of a time-domain transmission granularity, or a combination of the number and the symbol number of a time-domain transmission granularity. For example, the start position is a third time-domain transmission granularity in the frame period, or the start position is a forty-third symbol in the frame period, or the start position is a fourth symbol of the third time-domain transmission granularity in the frame periodicity and may be recorded as (3,4). The relative position may be an offset value relative to a predetermined time-domain position, for example, an offset value relative to an end time of the frame period.

The network side device may flexibly configure a length of the first periodicity and the time-domain transmission resource used for the uplink transmission in the first periodicity according to data amounts of uplink transmission and downlink transmission; and may also flexibly configure lengths of Guard Periods (GP) between the uplink transmission and the downlink transmission in the first periodicity according to interference factors from a distal base station.

Step 32: transmitting the configuration information of the first periodicity and the first indication information to the terminal through broadcast information by the network side device.

The network side device may transmit the configuration information and the first indication information of the first periodicity through the broadcast information, so as to inform the terminal of configuration relevant to the first periodicity and the time-domain transmission resource available for the uplink transmission in the first periodicity. Specifically, the broadcast information may be transmitted through a broadcast channel, such as the broadcast information may be broadcast through a message similar to a Master Information Block (MIB) of a Physical Broadcast Channel (PBCH) in the LTE.

Through above steps, a method for flexibly configuring the frame periodicity is implemented in some embodiments of the present disclosure. Through the method, resources for the uplink transmission and the downlink transmission may be flexibly adjusted in some embodiments of the present disclosure, so as to be adapted to requirements of uplink and downlink services and thereby not be limited to a certain type of fixed uplink and downlink configurations and GP configuration, or certain types of fixed uplink and downlink configurations and GP configurations. Additionally, some embodiments of the present disclosure may also flexibly configure the length of the GP, so as to be adapted to a requirement of eliminating network interference.

In some embodiments of the present disclosure, in case that the downlink transmission exists in the first periodicity, a time-domain transmission resource used for transmitting a synchronization signal may be included in the first periodicity, and a first time-domain transmission granularity in which the synchronization signal is arranged is a predetermined time-domain transmission granularity used for the downlink transmission. The first time-domain transmission granularity may be a first time-domain transmission granularity in the first periodicity. In the above method, the network side device may further transmit the synchronization signal in the first time-domain transmission granularity.

As one implementation, time-domain transmission resources between an end time of the first time-domain transmission granularity and a start time of the uplink transmission in the first periodicity may include at least one of a downlink transmission resource, a blank transmission resource, and the guard period between the uplink transmission and the downlink transmission. The blank transmission resource represents that the blank transmission resource cannot be used for a transmission of the terminal itself, but may be used for transmissions of other terminals. The guard period between the uplink transmission and the downlink transmission represents that resources corresponding to the guard periods cannot be used for any transmission.

Configurations of the first periodicity and the uplink transmission resources are implemented through the above steps. In order to further indicate configuration of the downlink transmission resource, the above method provided in some embodiments of the present disclosure further includes: transmitting second indication information to the terminal through a dedicated signaling by the network side device. The second indication information is used to indicate whether time-domain transmission resources other than the first time-domain transmission granularity and the time-domain transmission resource available for the uplink transmission in the first periodicity are to be used for the downlink transmission. The network side device may inform the terminal of information about the downlink transmission resource through a fashion similar to a Radio Resource Control (RRC) signaling.

Specifically, the second indication information is used to indicate absolute time-domain position information or relative time-domain position information of a time-domain transmission resource to be used for the downlink transmission in the time-domain transmission resources other than the first time-domain transmission granularity and the time-domain transmission resource available for the uplink transmission in the first periodicity. The absolute time-domain position information may include a number of a time-domain transmission granularity, a symbol number of a time-domain transmission granularity, or a combination of the number and the symbol number of a time-domain transmission granularity. The relative time-domain position information includes an offset value relative to a predetermined time-domain position.

Through the above steps, configuring and informing the downlink transmission resource is further implemented in some embodiments of the present disclosure. Informing the uplink transmission resource through the broadcast information may reduce an overhead of a system signaling. Additionally, informing the downlink transmission resource through the dedicated signaling may increase flexibility of scheduling the terminal.

Figure 5:
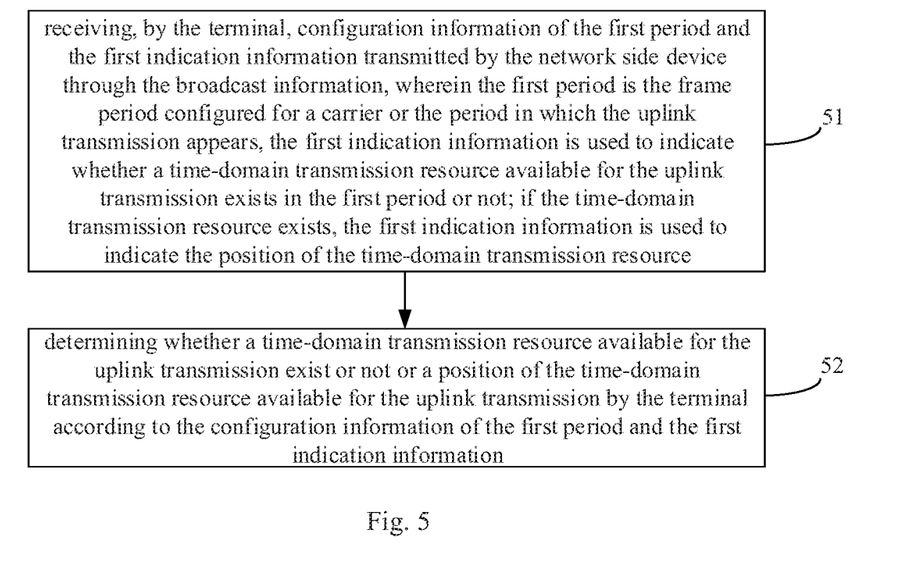
FIG. 5 is another flowchart of a method for configuring a frame structure provided in the embodiments of the present disclosure.

Referring to FIG. 5, some embodiments of the present disclosure provide a method for configuring a frame structure. The method is applied to the terminal. The method includes steps 51 and 52.

Step 51: receiving, by the terminal, configuration information of the first periodicity and the first indication information transmitted by the network side device through the broadcast information, wherein the first periodicity is the frame periodicity configured for a carrier or the periodicity in which the uplink transmission appears, the first indication information is used to indicate whether a time-domain transmission resource available for the uplink transmission exists in the first periodicity or not; if the time-domain transmission resource exists, the first indication information is used to indicate the position of the time-domain transmission resource available for the uplink transmission.

Step 52: determining whether a time-domain transmission resource available for the uplink transmission exists or not or a position of the time-domain transmission resource available for the uplink transmission by the terminal according to the configuration information of the first periodicity and the first indication information.

As described above, each first periodicity includes a plurality of time-domain transmission granularities. Each of the plurality of time-domain transmission granularities includes one or more symbols. In case that the time-domain transmission resource available for the uplink transmission exists in the first periodicity, at most one switch point for switching transmission directions is included in the first periodicity, and a switch direction is from the downlink transmission to the uplink transmission at this switch point. Additionally, in continuous N first periodicities, positions of the switch points in the N first periodicities are the same.

As one implementation, an entirety of the first periodicity may be used for the uplink transmission or the downlink transmission. For example, in case that the entirety of the first periodicity is used for the uplink transmission, the first indication information may be further used to indicate that all time-domain resources in the first periodicity may be used for the uplink transmission.

Generally, the time-domain transmission resource available for the uplink transmission in the first periodicity may be configured semi-statically through the first indication information in the broadcast information. In case that the time-domain transmission resource available for the uplink transmission needs to be changed, the change of the time-domain transmission resource available for the uplink transmission may be indicated by changing contents of the first indication information. Therefore, in a time interval before the first indication information is changed, the time-domain transmission resource available for the uplink transmission in the first periodicity is not changed, and is only used for the uplink transmission.

The time-domain transmission resource used for transmitting the synchronization signal may be included in the first periodicity, and the first time-domain transmission granularity in which the synchronization signal is arranged is a predetermined time-domain transmission granularity used for the downlink transmission. Generally, the first time-domain transmission granularity may be a first time-domain transmission granularity in the first periodicity. Time-domain transmission resources between the end time of the first time-domain transmission granularity and the start time of the uplink transmission in the first periodicity may include at least one of the downlink transmission resource, the blank transmission resource, and the guard period between the uplink transmission and the downlink transmission.

In the above method, the terminal may also receive the second indication information transmitted by the network side device through the dedicated signaling. The second indication information is used to indicate whether the time-domain resource other than the first time-domain transmission granularity in the first periodicity is to be used for the downlink transmission or not. The terminal determines the time-domain transmission resource used for the downlink transmission according to the second indication information, and receives information transmitted in the time-domain transmission resource used for the downlink transmission.

The second indication information is specifically used to indicate the absolute time-domain position information or the relative time-domain position information of the time-domain transmission resource to be used for the downlink transmission in the time-domain transmission resources other than the first time-domain transmission granularity in the first periodicity. The absolute time-domain position information may include a number of a time-domain transmission granularity, a symbol number of a time-domain transmission granularity, or a combination of the number and the symbol number of a time-domain transmission granularity. The relative time-domain position information includes an offset value relative to a predetermined time-domain position.

Figure 6:
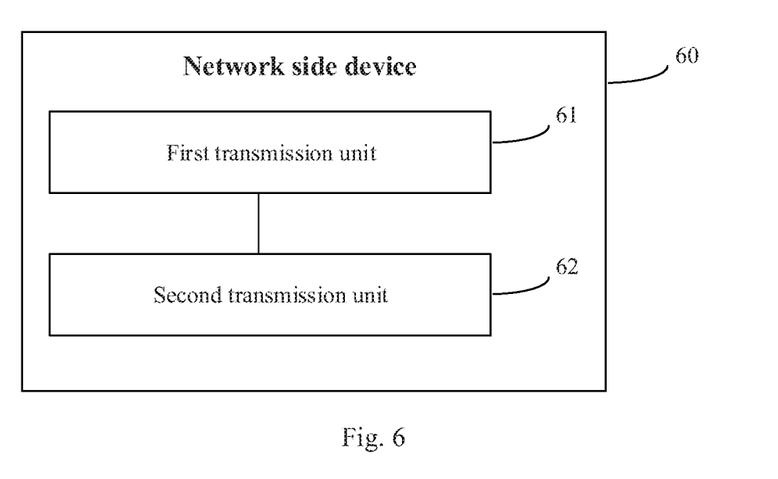
FIG. 6 is a structural schematic diagram of a network side device provided in some embodiments of the present disclosure.

Based on the above method, some embodiments of the present disclosure further provide a device for implementing the above method. Referring to FIG. 6, some embodiments of the present disclosure provide a network side device. The network side device may specifically be a base station or other network side nodes, such as a transmission point. As shown in FIG. 6, the network side device 60 includes a first transmission unit 61.

The first transmission unit 61 is to transmit the configuration information of the first periodicity and the first indication information to the terminal through broadcast information, wherein the first periodicity is the frame periodicity configured for a carrier or a periodicity in which the uplink transmission appears, the first indication information is used to indicate whether a time-domain transmission resource available for the uplink transmission exists in the first periodicity or not; if the time-domain transmission resource exists, the first indication information is used to indicate a position of the time-domain transmission resource available for the uplink transmission.

Each first periodicity includes a plurality of time-domain transmission granularities. Each of the plurality of time-domain transmission granularities includes one or more symbols. In case that the time-domain transmission resource available for the uplink transmission exists in the first periodicity, each first periodicity includes at most one switch point for transmission directions, and the switch direction is from downlink transmission to uplink transmission at this switch point. In the N continuous first periodicities, positions of the switch points or the time-domain transmission resources available for the uplink transmission in the first periodicities are same in the first periodicities As one implementation, the entirety of the first periodicity may be used for the uplink transmission or the downlink transmission. For example, in case that the entirety of the first periodicity is used for the downlink transmission, the first indication information may be further used to indicate that all time-domain resources in the first periodicity may be used for the uplink transmission.

Generally, the time-domain transmission resource available for the uplink transmission in the first periodicity may be configured semi-statically through the first indication information in the broadcast information. In case that the time-domain transmission resource available for the uplink transmission needs to be changed, the change of the time-domain transmission resource available for the uplink transmission may be indicated by changing contents of the first indication information. Therefore, in a time interval before the first indication information is changed, the time-domain transmission resource available for the uplink transmission in the first periodicity is not changed, and is only used for the uplink transmission.

In case that the downlink transmission exists in the first periodicity, the first time-domain transmission granularity is a time-domain transmission granularity used for the downlink transmission and may include a transmission resource used for transmitting the synchronization signal. Generally, the first time-domain transmission granularity may be a first time-domain transmission granularity in the first periodicity. Time-domain transmission resources between the end time of the first time-domain transmission granularity and the start time of the uplink transmission in the first periodicity may include at least one of the downlink transmission resource, the blank transmission resource, or the guard period between the uplink transmission and the downlink transmission.

Optionally, the above network side device 60 may further include a second transmission unit 62.

The second transmission unit 62 is to transmit the second indication information to the terminal through the dedicated signaling. The second indication information is used to indicate whether time-domain transmission resources other than the first time-domain transmission granularity and the time-domain transmission resource available for the uplink transmission in the first periodicity is to be used for the downlink transmission.

The second indication information specifically is used to indicate absolute time-domain position information or relative time-domain position information of a time-domain transmission resource to be used for the downlink transmission, in the time-domain transmission resources other than the first time-domain transmission granularity and the time-domain transmission resource available for the uplink transmission in the first periodicity. The absolute time-domain position information may include a number of a time-domain transmission granularity, a symbol number of a time-domain transmission granularity, or a combination of the number and the symbol number of a time-domain transmission granularity. The relative time-domain position information includes an offset value relative to a predetermined time-domain position.

Some embodiments of the present disclosure further provide a network side device. The network side device includes a processor; a storage connected to the processor through a bus interface; and a transmitter connected to the processor through the bus interface, wherein the storage is to store programs and data used by the processor when the processor executes an operation.

The processor is to generate the configuration information of the first periodicity and the first indication information by invoking and executing the programs and the data stored in the storage. The transmitter is to transmit the configuration information of the first periodicity and the first indication information to the terminal through the broadcast information. The first periodicity is a frame periodicity configured for a carrier or a periodicity in which the uplink transmission appears, the first indication information is used to indicate whether a time-domain transmission resource available for the uplink transmission exists in the first periodicity or not; if the time-domain transmission resource exists, the first indication information indicates a position of the time-domain transmission resource available for the uplink transmission.

Specific implementation of the network side device may be obtained by referring to the above description, and will not be repeated herein.

Figure 7:
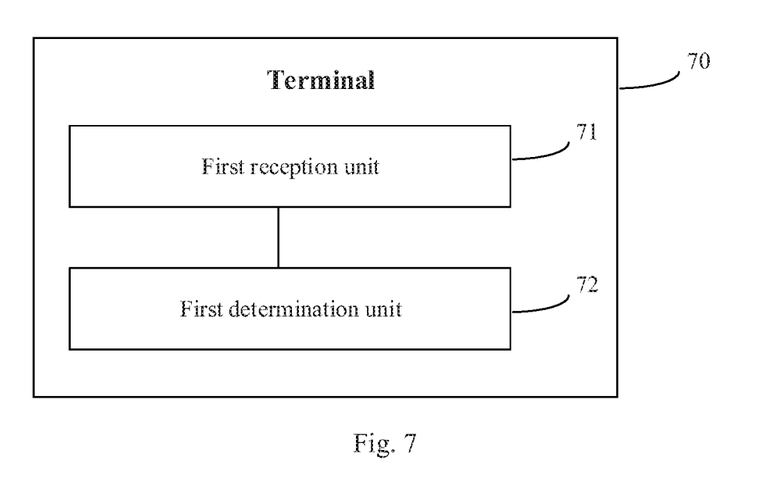
FIG. 7 is a structural schematic diagram of a terminal provided in some embodiments of the present disclosure.

Referring to FIG. 7, some embodiments of the present disclosure provide a terminal 70. The terminal 70 includes a first reception unit 71 and a first determination unit 72.

The first reception unit 71 is to receive the configuration information of the first periodicity and the first indication information transmitted by the network side device through the broadcast information, wherein the first periodicity is the frame periodicity configured for a carrier or the periodicity in which the uplink transmission appears, the first indication information is used to indicate whether a time-domain transmission resource available for the uplink transmission exists in the first periodicity or not; if the time-domain transmission resource exists, the first indication information is used to indicate the position of the time-domain transmission resource available for the uplink transmission The second determination unit 72 is to determine whether the time-domain transmission resource available for the uplink transmission exists or not or a position of the time-domain transmission resource available for the uplink transmission according to the configuration information of the first periodicity and the first indication information.

Each first periodicity includes a plurality of time-domain transmission granularities. Each of the plurality of time-domain transmission granularities includes one or more symbols. In case that the time-domain transmission resource available for the uplink transmission exists in the first periodicity, at most one switch point for switching transmission directions is included in the first periodicity, and a switch direction is from the downlink transmission to the uplink transmission at this switch point. Additionally, in continuous N first periodicities, positions of the switch points or the time-domain transmission resources available for the uplink transmission in the N first periodicities are the same, wherein N is an integer.

As one implementation, an entirety of the first periodicity may be used for the uplink transmission or the downlink transmission. For example, in case that the entirety of the first periodicity is used for the downlink transmission, the first indication information may be further used to indicate that all time-domain resources in the first periodicity may be used for the uplink transmission.

Generally, the time-domain transmission resource available for the uplink transmission in the first periodicity may be configured semi-statically through the first indication information in the broadcast information. In case that the time-domain transmission resource available for the uplink transmission needs to be changed, the change of the time-domain transmission resource available for the uplink transmission may be indicated by changing contents of the first indication information. Therefore, in a time interval before the first indication information is changed, the time-domain transmission resource available for the uplink transmission in the first periodicity is not changed, and is only used for the uplink transmission.

Further, the time-domain transmission resource used for transmitting the synchronization signal may be included in the first periodicity, and the first time-domain transmission granularity in which the synchronization signal is arranged is a predetermined time-domain transmission granularity used for the downlink transmission. Generally, the first time-domain transmission granularity may be a first time-domain transmission granularity in the first periodicity. Time-domain transmission resources between the end time of the first time-domain transmission granularity and the start time of the uplink transmission in the first periodicity may include at least one of the downlink transmission resource, the blank transmission resource, and the guard period between the uplink transmission and the downlink transmission.

Further, the terminal may include a second reception unit and a second determination unit. The second reception unit is to receive the second indication information transmitted by the network side device through the dedicated signaling. The second indication information is used to indicate whether a time-domain resource other than the first time-domain transmission granularity in the first periodicity is to be used for the downlink transmission or not.

The second determination unit is to determine a time-domain transmission resource used for the downlink transmission according to the second indication information, and receive information transmitted in the time-domain transmission resource used for the downlink transmission.

The second indication information is specifically used to indicate the absolute time-domain position information or the relative time-domain position information of the time-domain transmission resource to be used for the downlink transmission, in the time-domain transmission resources other than the first time-domain transmission granularity in the first periodicity. The absolute time-domain position information may include a number of a time-domain transmission granularity, a symbol number of a time-domain transmission granularity, or a combination of the number and the symbol number of a time-domain transmission granularity. The relative time-domain position information includes an offset value relative to a predetermined time-domain position.

Some embodiments of the present disclosure further provide a terminal. The terminal includes a processor; a storage connected to the processor through a bus interface; and a receiver connected to the processor through the bus interface, wherein the storage is to store programs and data used by the processor when the processor executes an operation.

The receiver is to receive configuration information of a first periodicity and first indication information transmitted by the network side device through the broadcast information, wherein the first periodicity is the frame periodicity configured for a carrier or a periodicity in which the uplink transmission appears, the first indication information is used to indicate whether a time-domain transmission resource available for the uplink transmission exists in the first periodicity or not; if the time-domain transmission resource exists, the first indication information indicates a position of the time-domain transmission resource available for the uplink transmission.

The processor is to, through invoking and executing the programs and the data stored in the storage, determine whether the time-domain transmission resource available for the uplink transmission exists or not or the position of the time-domain transmission resource available for the uplink transmission according to the configuration information of the first periodicity and the first indication information received by the receiver.

Specific implementation of the terminal may be obtained by referring to the above description, and will not be repeated herein.

In view of the above, the method for configuring the frame structure, the network side device and the terminal provided in some embodiments of the present disclosure may flexibly adjust uplink and downlink transmission resources, so as to be adapted to requirements of uplink and downlink services and thereby not be limited to a certain type of fixed uplink and downlink configurations and GP configuration, or certain types of fixed uplink and downlink configurations and GP configurations. Additionally, some embodiments of the present disclosure may also flexibly configure the length of the GP, so as to be adapted to a requirement of network interference.

The above described embodiments of the present disclosure are optional embodiments. It should be noted that numerous modifications and embellishments may be made by one of ordinary skills in the art without departing from the principle of the present disclosure, and such modifications and embellishments also fall within the scope of the present disclosure.

What is claimed is:

1. A method for configuring a frame structure, comprising:
    transmitting configuration information of a first periodicity and first indication information to a terminal through broadcast information by a network side device,
    wherein the first periodicity is a frame periodicity configured for a carrier or a periodicity in which a uplink transmission appears, the first periodicity comprises a plurality of time-domain transmission granularities, and each of the plurality of time-domain transmission granularities comprises one or more symbols, a symbol quantity of the one or more symbols in the each of the plurality of time-domain transmission granularities is same as a symbol quantity of one or more symbols in each of remaining of the plurality of time-domain transmission granularities;
    the first indication information is used to indicate whether a time-domain transmission resource available for the uplink transmission exists in the first periodicity or not; and if the time-domain transmission resource available for the uplink transmission exists in the first periodicity, at least a last symbol in a last time-domain transmission granularity in the frame periodicity is used for the uplink transmission, the first indication information is further used to indicate a start position of the time-domain transmission resource available for the uplink transmission, at most one switch point for switching a transmission direction is comprised in the first periodicity, and a switch direction at the switch point is from downlink transmission to uplink transmission,
    a duration of the first periodicity is configurable.

2. The method according to claim 1, wherein, the first indication information is further used to indicate that all time-domain resources in the first periodicity are available for the uplink transmission.

3. The method according to claim 1, wherein before the first indication information is changed, the time-domain transmission resource available for the uplink transmission is only used for the uplink transmission.

4. The method according to claim 1, wherein, in case that the downlink transmission exists in the first periodicity, a first time-domain transmission granularity is a time-domain transmission granularity used for the downlink transmission and comprises transmission resources used for transmitting a synchronization signal, and
    the first time-domain transmission granularity is a first time-domain transmission granularity in the first periodicity.

5. The method according to claim 4, wherein, time-domain transmission resources between an end time of the first time-domain transmission granularity and a start time of the uplink transmission in the first periodicity comprise at least one of a downlink transmission resource, a blank transmission resource, and a guard period between the uplink transmission and the downlink transmission.

6. The method according to claim 4, further comprising:
    transmitting second indication information to the terminal through a dedicated signaling by the network side device, wherein the second indication information is used to indicate whether time-domain transmission resources other than the first time-domain transmission granularity and the time-domain transmission resource available for the uplink transmission in the first periodicity are to be used for the downlink transmission.

7. The method according to claim 6, wherein,
    the second indication information is specifically used to indicate absolute time-domain position information or relative time-domain position information of a time-domain transmission resource to be used for the downlink transmission in the time-domain transmission resources other than the first time-domain transmission granularity and the time-domain transmission resource available for the uplink transmission in the first periodicity;
    the absolute time-domain position information comprises a number of a time-domain transmission granularity, a symbol number of a time-domain transmission granularity, or a combination of a number and a symbol number of a time-domain transmission granularity;
    the relative time-domain position information comprises an offset value relative to a predetermined time-domain position.

8. A network side device, comprising
    a processor, a storage, and a transmitter,
    wherein, the storage is configured to store programs and data, the transmitter is configured to transmit information from the processor to a terminal, and the processor is to perform the method according to claim 1, by invoking and executing the programs and the data stored in the storage.

9. The method according to claim 1, wherein, a downlink resource and an uplink resource in the first periodicity is configurable and is configurable to a symbol level.

10. A method for configuring a frame structure, comprising:
receiving, by a terminal, configuration information of a first periodicity and first indication information transmitted by a network side device through broadcast information, wherein the first periodicity is a frame periodicity configured for a carrier or a periodicity in which a uplink transmission appears, the first periodicity comprises a plurality of time-domain transmission granularities, and each of the plurality of time-domain transmission granularities comprises one or more symbols, a symbol quantity of the one or more symbols in the each of the plurality of time-domain transmission granularities is same as a symbol quantity of one or more symbols in each of remaining of the plurality of time-domain transmission granularities; the first indication information is used to indicate whether a time-domain transmission resource available for the uplink transmission exists in the first periodicity or not; and if the time-domain transmission resource available for the uplink transmission exists in the first periodicity, at least a last symbol in a last time-domain transmission granularity in the frame periodicity is used for the uplink transmission, the first indication information is further used to indicate a start position of the time-domain transmission resource available for the uplink transmission, at most one switch point for switching a transmission direction is comprised in the first periodicity, and a switch direction at the switch point is from downlink transmission to uplink transmission; and
determining whether the time-domain transmission resource available for the uplink transmission exists or not or the position of the time-domain transmission resource available for the uplink transmission by the terminal according to the configuration information of the first periodicity and the first indication information, a duration of the first periodicity is configurable.

11. The method according to claim 10, wherein, the first indication information is further used to indicate that all time-domain resources in the first periodicity are available for the uplink transmission.

12. The method according to claim 10, wherein before the first indication information is changed, the time-domain transmission resource available for the uplink transmission is only used for the uplink transmission.

13. The method according to claim 10, wherein, in case that the downlink transmission exists in the first periodicity, a first time-domain transmission granularity is a time-domain transmission granularity used for the downlink transmission and comprises transmission resources used for transmitting a synchronization signal, and
the first time-domain transmission granularity is a first time-domain transmission granularity in the first periodicity.

14. The method according to claim 13, wherein, time-domain transmission resources between an end time of the first time-domain transmission granularity and a start time of the uplink transmission in the first periodicity comprise at least one of a downlink transmission resource, a blank transmission resource, and a guard period between the uplink transmission and the downlink transmission.

15. The method according to claim 13, further comprising:
receiving, by the terminal, second indication information transmitted by the network side device through a dedicated signaling, wherein the second indication information is used to indicate whether time-domain transmission resources other than the first time-domain transmission granularity in the first periodicity are to be used for the downlink transmission;
determining, by the terminal, time-domain transmission resource used for the downlink transmission according to the second indication information, and receiving information transmitted in the time-domain transmission resource used for the downlink transmission.

16. The method according to claim 15, wherein, the second indication information is specifically used to indicate absolute time-domain position information or relative time-domain position information of a time-domain transmission resource to be used for the downlink transmission in the time-domain transmission resources other than the first time-domain transmission granularity in the first periodicity;
the absolute time-domain position information comprises a number of a time-domain transmission granularity, a symbol number of a time-domain transmission granularity, or a combination of a number and a symbol number of a time-domain transmission granularity;
the relative time-domain position information comprises an offset value relative to a predetermined time-domain position.

17. A terminal, comprising
a processor, a storage, and a receiver,
wherein, the receiver is to receive information transmitted by a network side device, the storage is configured to store programs and data, and
the processor is configured to perform the method according to claim 11, by invoking and executing the programs and the data stored in the storage.

18. The method according to claim 10, wherein, a downlink resource and an uplink resource in the first periodicity is configurable and is configurable to a symbol level.

* * * * *